United States Patent [19]

Vogt

[11] 4,068,572

[45] Jan. 17, 1978

[54] APPARATUS FOR HEATING FOOD

[76] Inventor: Hans Vogt, 8391 Erlau, Passau, Germany

[21] Appl. No.: 426,608

[22] Filed: Dec. 20, 1973

Related U.S. Application Data

[62] Division of Ser. No. 222,406, Jan. 31, 1972, abandoned.

[51] Int. Cl.² ............................................. A21B 1/24
[52] U.S. Cl. ...................................... 99/447; 99/448; 219/400
[58] Field of Search ................. 99/448, 332, 353, 401, 99/419, 420, 426, 443, 447; 126/1, 19, 105, 146; 219/391–392, 395, 399, 400, 407–408

[56] References Cited

U.S. PATENT DOCUMENTS

| | | | |
|---|---|---|---|
| 1,986,088 | 1/1935 | Wild | 219/400 X |
| 2,214,630 | 9/1940 | Wheeler | 99/401 UX |
| 2,600,760 | 6/1952 | Guffey | 99/443 R X |
| 3,261,343 | 7/1966 | Tibell | 219/400 UX |
| 3,261,650 | 7/1966 | Stromquist | 219/400 UX |
| 3,467,815 | 9/1969 | Robinson | 219/400 |
| 3,614,388 | 10/1971 | Robinson | 219/400 |

Primary Examiner—Peter Feldman
Assistant Examiner—Arthur O. Henderson
Attorney, Agent, or Firm—Bacon & Thomas

[57] ABSTRACT

The invention relates to a method of heating food stuffs, especially discrete articles such as potatoes, meat and bread in a heat-insulated housing, employing heated gases circulated through the housing at high velocity. The invention is further concerned with means or apparatus for carrying out the method in which a heat-insulated housing is provided with a sheet metal container mounted in it and open at least below and above, the container being laterally spaced from the walls of the housing and furthermore a blower being mounted in the intermediate space between the roof of the housing and the upper opening in the sheet metal container, heating elements being mounted in the intermediate space between the lateral walls of the housing and of the container and a temperature controller being provided to maintain the pre-set treatment temperature.

39 Claims, 30 Drawing Figures

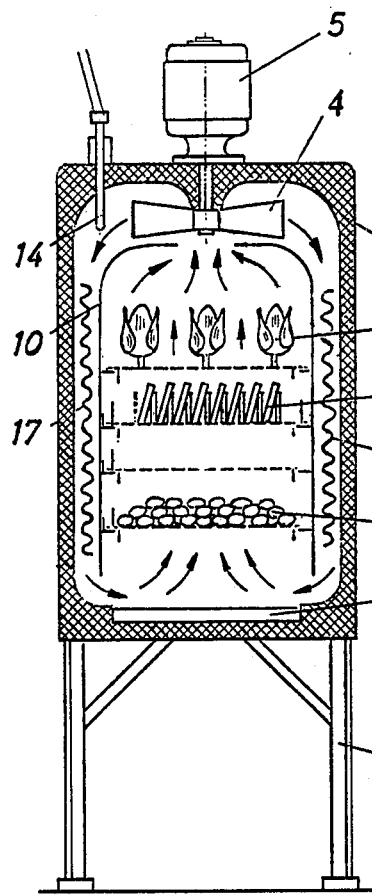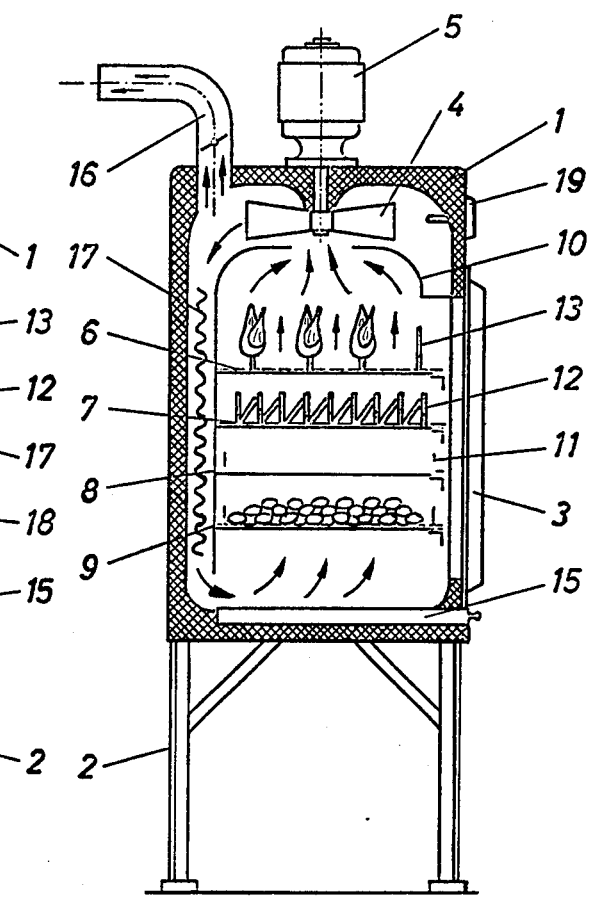
Fig. 1   Fig. 2
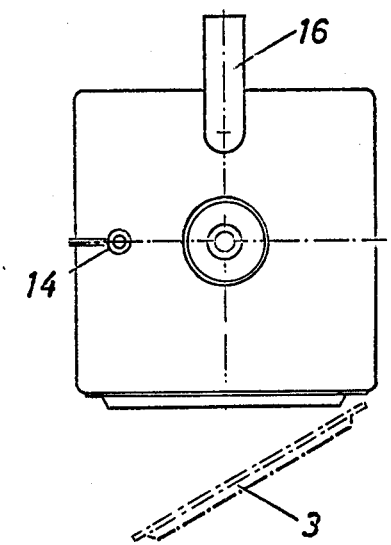
Fig. 3
Fig. 4
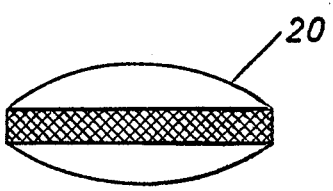
Fig. 5

APPARATUS FOR HEATING FOOD

This is a division, of application Ser. No. 222,406, filed Jan. 31, 1972, now abandoned.

By the use of the invention not only is the heating of food stuffs improved, i.e. simplified, from the economical point of view, but also products are provided with completely new taste qualities which are moreover distinguished by outstanding benefit and long shelf life.

It has already been proposed long ago to employ circulating heated air for heating food stuffs. However, this method of heat transfer has hitherto had no success in practice. For one thing the associated apparatus which was developed largely only theoretically but not achieved in practice was unusable insofar as it was not possible to apply the necessary quantities of heat in a short time and on all sides to the food stuffs to be treated. Moreover they were relatively complicated in construction and thus expensive. Another thing is that hitherto it has not been possible to set the most favourable critical temperatures and keep them constant so that only reduced taste qualities could be achieved in products treated in this way.

The method according to the invention and the associated apparatus according to the invention avoid these disadvantages. It is characterized in that in a heat-insulated housing circulating hot gases flowing at high velocity are maintained always at the critical temperature lying between 80° C and 400° C at which the food stuffs to be treated take up the taste characteristics which are most favourable for consumption and at this temperature and with flow velocities between 3 and 10 meters per second, the gases are conducted to all sides of the surfaces of the food stuffs.

In the method according to the invention I do without the usual means in which the food stuffs are normally set out for heat treatment, such as containers, pans, pots. It has been found particularly favourable to arrange the food stuffs coming into question for the heat treatment according to the invention, for example unpeeled raw potatoes, peeled potatoes in the form of long angular strips, slices of bread, poultry, pieces of meat and baked goods so that the flow of gas that transmits the heat preferably passes over them at right angles to their supporting surfaces. This is made possible in that the smaller items of food stuff coming into question are mounted on gas-permeable grids or grills which preferably are penetrated by hot gases, for example hot air, flowing upwards from below. In the case of larger items such as chickens they could be impaled on spits or pins. Flat pieces of meat or bread could be held between guiding grids so that the heat-transfer gases can pass over all faces of them.

The first-mentioned method of mounting has in particular the great advantage in the production of pommes frites or roast potatoes that only a very small amount of work has to be done. Shaken out on the grid, the hot gas stream passes over the entire surface of the food stuff, heating it and browning its surface. Smaller items are prevented from being lifted up by the second grid or a wire frame mounted over them.

The maximum temperature of the gas flow in the circuit is critical and differs according to the kind of food stuffs to be treated. In the apparatus according to the invention it is adjusted by a built-in temperature controller, kept constant by it, and read off on a thermometer. In this way the most favourable heating or roasting conditions are maintained throughout the whole treatment period.

As the hot stream of gases passes over all sides of the items to be treated, local burning or unpalatable points are avoided. The treatment temperatures are critically limited to a small temperature range especially for the formation of the valuable but very unstable taste-giving materials. As indicated above, they vary according to the kind of food to be prepared and they lie for example for the coagulation of the white in eggs below 100° C but for roasting biscuits or rusks and in the manufacture of baked goods the temperatures are between 150° C and 200° C and in the preparation of pommes frites about 200° C to 220° C. To make medium-sized potatoes palatable, roasting temperatures of 300° C to 350° C are used, the treatment time varying between 30 and 45 minutes according to the size of the potatoes. In the case of meat, the temperatures and periods vary according to the desired method of preparation.

The method according to the invention can therefore be carried out advantageously by means of apparatus which comprises a heat-insulated housing with a door and a sheet metal container mounted in it spaced away from the walls of the housing on all sides and with its lower and upper faces and that face which is towards the door left open, and further with a blower arranged in the space between the roof of the housing and the upper opening of the container and heating elements in the space between the lateral walls of the housing and of the container and a temperature controller for maintaining the pre-set treatment temperature and horizontal grids, supporting frames or perforated sheets mounted in the container for receiving and supporting the food stuffs.

It is apparent that for the reasons given above the heat treatment of many food stuffs is difficult as extremely uniform heating of the goods must be maintained and as uniform a temperature as possible must be kept throughout. For example, in the treatment of potatoes to make pommes frites or roast potatoes, there is the difficulty that a mean temperature of the goods of around 150° C temperature differences of as little as 10° C can produce a light bitter taste at individual points on the surface of the potato while other points still do not show the desired light browning, i.e. they merely have the appearance of boiled potatoes.

Completely uniform contact with all portions of the individual items of food stuff to be treated with the rapidly flowing heated gas or gas mixture is achieved according to a further feature of the invention in that the items of food stuff to be treated are exposed to the heated rapidly flowing gases in respective gas-permeable drums rotating about horizontal axes. The items of food contained in the drums which are continuously rotating during the treatment and are traversed by the hot gases, are kept continuously in movement so that they are always altering their position with respect to the direction of flow of the gases and uniform heat transfer is obtained to all parts of the surface of the goods under treatment.

In this manner the production of pommes frites can be undertaken particularly favourably, with the pommes frites being made uniformly yellow and having a tasty skin which is somewhat detached from the interior. The method thus replaces the so-called frittures or fryers which have hitherto been common for the manufacture of pommes frites and in which the pieces of potato are immersed in a container in very hot fat. In this old method it was not possible to avoid the fat progressively acquiring a rancid taste which was transferred to the pieces of potato immersed in it and thus reduced their palatability. Moreover, the method is also to be preferred from dietetic grounds over the known process and over roasting in pans as there is no absorption of fat, or no cancer-producing and taste-upsetting fat breakdown products arise.

The said method allows in particular the aromatisation of the smallest items of food stuff, especially small pieces of meat. These aromatised grit-sized or rice-grain-sized particles could be compressed or stuck together to form larger pieces. In this manner there are produced new items of food which are aromatised not only at their surfaces but uniformly throughout their whole interior.

The second embodiment of the method according to the invention is carried out in apparatus comprising a heat-insulated housing with a door and a sheet metal container mounted in the housing and open below and above and at that side facing towards the door and if necessary also at the back and spaced from the walls of the housing on both sides, and which further has a blower in the space between the roof of the housing and the upper opening of the sheet metal container and provided with heating elements in the space between the lateral walls of the housing and of the container, and a temperature controller for maintaining the pre-set treatment temperature and characterised according to the invention in that in the said sheet metal container at least one as-permeable drum is mounted to rotate about a horizontal axis and to receive the goods to be treated, the drum being connected to driving means. Preferably each drum is made to be removable and is also detachably connected to the associated drive and in particular the drums could be mounted on rotatable driven rollers and/or connected to a driving spindle through a clutch or coupling at their rear ends.

According to a further feature of the invention the drums could have peripheral walls made of closely perforated sheet metal or of close-mesh woven wire. It has been found particularly favourable if the drums are provided with a polytetrafluoroethylene coating.

According to an advantageous further feature of the invention, several drums could be arranged in the above-mentioned container above one another or alongside one another. Moreover, the apparatus according to the invention may comprise several constructional units of which at least one corresponds to the above-mentioned embodiment with fixed members for receiving the food stuffs to be treated, which is capable of receiving the exhaust gases from at least one unit of the rotating drum kind constructed in the manner described above.

A further improvement of the stated apparatus and the method described, especially a still more rapid and economical and energy-saving method of operation is achieved in a further embodiment of the invention with apparatus of the kind described having at least one gas-permeable drum rotating about a horizontal axis and mounted in a sheet metal container which is open below, above, to the front and to the rear, which is characterised in that the drum is open at at least one end face and the heat-insulated housing has a closable opening for insertion and, if necessary, removal of the food stuffs in the region of the open end face of the drum at substantially the height of the axis of rotation of the drum or above it. The drum can preferably also be open at both faces and then the heat-insulated housing has closable openings in the region of both open faces of the drum, the opening for insertion of the food stuff lying at about the height of the axis of rotation or above it and the opening for removing the food stuffs being arranged at the level of the lowest point of the periphery of the drum.

In this way the drum does not need to be taken out of the heat-insulated housing or out of the sheet metal casing in it, for filling and emptying. On the contrary, it remains inside, giving the advantage that the times necessary for the filling and emptying process are reduced, avoiding largely the associated loss of energy, and the amount of work required is restricted to the lowest possible value.

These advantages are present to a particularly great extent if, according to a further feature of the invention, the heat-insulated housing is mounted to be rotatable about an axis perpendicular to the axis of rotation of the drum. Then by tilting or angular movement of the housing the drum can be inclined and indeed if necessary turned to a vertical position, so that simple and rapid insertion of the items of food through the filling opening, which then lies uppermost, or rapid and simple removal of the treated food stuffs through the discharge opening, then lying at the bottom, is ensured.

Advantageously, the heat-insulated housing is capable of being secured in the position used for filling and emptying the drum. At the same time it has been found useful for the openings in the heat-insulated housing to be made capable of being closed off by respective rotary discs operable from outside the housing, pivotally mounted on the housing and provided with through openings. The inside of the heat-insulated housing is, according to an advantageous further feature of the invention, accessible through a floor flap in the housing, preferably heat-insulated. Moreover it is advantageous for the drum to be connected through sprockets and a roller-link chain to a driving motor preferably mounted on the roof of the housing.

A further advantageous embodiment of the method according to the invention lies in that thin slices or chips of potato, onions or thin slices of meat, preferably in a gas-permeable drum rotating about a horizontal axis, are exposed for eight to fifteen or seven to fifteen or seven to ten minutes to the flow of gas, preferably air or super-heated steam, and kept at a temperature between 140° C and 150° C or 105° C to 110° C or 160° C to 180° C. A novel, very tasty, and attractive product results if, in such treatment of thin slices or chips of potato, the raw slices or chips are, before the treatment with heated circulating gas, heated briefly in boiling water until the coagulation of the albumen at least at the surface of the pieces and the formation of a gas-impermeable skin. Moreover in the treatment of meat it is useful to subject the grilled slices of meat to a drying process before air-tight packaging.

In order to be able to grill poultry as well, in the manner according to the invention, it is necessary for the individual items, so that they are browned uniformly over their whole surface, to be mounted in the sheet metal container in the heat-insulated housing in such a manner that the axes of the birds extend substantially parallel to the direction of flow of the hot gases. As the poultry is grilled without its insides, therefore hollow inside, it is not possible in practice to hold the bird in the most favourable position in the strong air current simply by spitting, especially as the wings and legs do not remain lying directly against the body. If one lays the birds on grids instead, no uniform heating and browning can be achieved.

According to the invention these disadvantages are overcome in that the individual items of poultry are received head downwards in upwardly divergent wire frames. The insertion of the bird and the device itself are thus clearly uncomplicated. The individual items of poultry are held in the wire frames in a suitable position so that uniform heating is obtained.

As the individual items of poultry to be grilled have varying sizes (they can vary between roughly 0.7 and 1.4 kg in weight) and the cooling depends to a large extent on the length of the path which the heat penetrating from outside must traverse to reach the interior, in the grilling devices used hitherto there has been the disadvantage that small items of poultry are cooked much more quickly than large ones. This situation is particularly damaging where several items of any desired size are to be prepared simultaneously. According to the invention this disadvantage is furthermore avoided in that the frame includes a central hollow spit formed from at least three wires, which transfixes the item of poultry. This forms a passage in the interior of the item of poultry through which the hot air flow can pass and thereby also it effects additional heating from inside.

Several frames could advantageously be combined to form a grid unit capable of being slid into the container in the heat-insulated housing.

It has been found that, especially when grilling poultry, unpleasantly smelling tarry vapours can arise. As thorough investigations and temperature measurements have shown, the origin lies not in overheating of the fatty surface of the meat or poultry but in the increasing heating of the fat which drips onto a flat receiving container. By continuous contact with the passing hot gases, this fat soon reaches the critical decomposition temperature while the fat on the surfaces of the food stuffs remains below this temperature because of heat transfer to the interior.

According to a further feature of the invention, therefore, the fat dripping from the food stuffs is collected without reaching its critical decomposition temperature. For this purpose it is useful to provide on the floor of the grilling space a removable drip tray and a cooling device placed underneath it, which only cools the container sufficiently to prevent it decomposing the fat which it receives. In a preferred embodiment of the invention this container can have the form of a flat tray or pan which closes off the lower part of the grilling space and is cooled from below by water of predetermined temperature or flow velocity.

Instead of this the fat dripping from the food stuffs and lying in the lower part of the grilling space could be removed from the heating zone by a mechanical scraper or by a continuously travelling floor, and conducted into a receiving vessel.

Decomposition of the fat can also be avoided according to the invention by arranging that the floor of the grilling space has the shape of a funnel which is cooled by the outside air and opens into a receiving vessel which serves to collect the fat dripping from the food stuffs.

The hot stream of gas can advantageously be guided away from the floor of the grilling space by guide plates. This allows the collected fat to cool more easily and also reduces the amount of heat lost from the grilling space.

It is advisable also to coat all those parts which come into contact with the fat with polytetrafluoroethylene or similar materials which prevent the fat sticking.

In the various embodiments of the process according to the invention so far described and the associated apparatus, the food stuffs are subjected to heat treatment in batches. As the use and consumption of roast goods, especially potato chips or so-called pommes soufflees is always becoming progressively greater, their production must be further rationalised in order to cope with the increased demand. This is especially true of potato chips which are packed in small units and are becoming a subject of daily need.

In the batch production of heat-treated food stuffs, a dead period is unavoidable in which the individual equipment is loaded and emptied.

This is avoided in a final embodiment of the process according to the invention, which provides for the continuous production of roast goods, especially potato chips or so-called pommes soufflees, and is characterised in that the items of food stuff emerging from a known food mincer are fed to a bath of boiling water from which they are led by means of a bucket elevator through a funnel into a gas-permeable roasting drum and here they are exposed to hot air flowing in a direction transverse to their direction of movement and they are then dried and aromatised in order to leave them finished.

Unexpected effects arise relating both to the continuous preparation of the goods to be treated and also to the drying, roasting and aromatising process being carried out in the same manner. These unexpected effects comprise first in the formation of a gas-tight closed surface on the potato, apparently caused by the coagulation of the albumen in the potato in the hot water bath, which coagulation already starts at 80° C, secondly in the unusual ballon effect with its advantages for rapid finishing, for the attractive appearance and palatability this effect occurring during the subsequent heating with the development of steam in the interior of the potato slices, and thirdly and finally in the transmission of the appetising taste of the meat broth added to the coagulating water bath or other aromas to the chips to be treated, and, thereby in its easily obtainable improvement in taste.

The food stuffs cut up into small pieces pass continuously into a water bath which is preferably heated by the exhaust gases from the adjacent connected drum roaster and according to need it is treated with aromatising media (e.g. fat-free meat essences, broths of onions and similar seasoning). The items of food stuff then pass via a conveyor device into a meter-long extremely porous wire drum which is rotatably mounted within a sheet metal container which is surrounded by heating bodies in a heat-insulated housing.

So that, during the heat treatment, the goods roll progressively towards the drum outlet, this drum is mounted in an inclined position. The insertion and removal of the goods to be grilled or dried is performed through rotary gas locks which prevent the steam that arises at these points from escaping into the working area. The hot steam arising in the roasting drum is on the contrary used to keep the water bath ahead of the drum continuously at its simmering or boiling temperature.

This apparatus accordingly allows the continuous and uniform production of roast products, primarily of tasty pommes soufflees, in uniform quality without the time and labour involved in filling and emptying small drum units.

Some embodiments of the invention are now to be described by way of example in conjunction with the accompanying drawings.

In these, shown diagrammatically:

FIG. 1 is a view of a vertical section, parallel to the front wall, through apparatus according to the invention with fixed means for receiving the food stuffs;

FIG. 2 shows a vertical section through the apparatus of FIG. 1 but perpendicular to the front wall;

FIG. 3 is a view of the apparatus of FIGS. 1 and 2 from above;

FIG. 4 is a longitudinal section through a fresh slice of potato;

FIG. 5 is a longitudinal section through a slice of potato according to FIG. 4 after treatment according to the invention;

Figure 6:
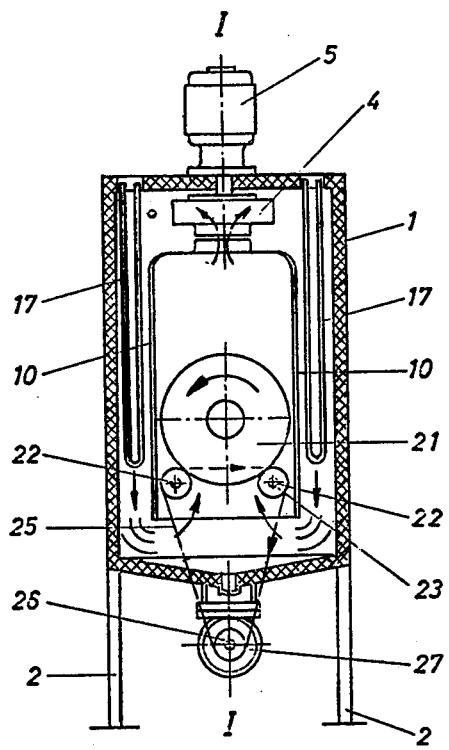
FIG. 6 is a vertical section, parallel to the front wall, through apparatus according to the invention with a rotating drum to receive individual items of food.

The apparatus according to FIGS. 1 to 3 can be employed in a larger or smaller form in domestic kitchens or in large kitchens. In an insulated sheet metal housing 1 which in the larger forms preferably stands on feet 2, and has a forwardly hinged door 3, there is a powerful fan 4 at the upper end, driven by the motor 5 through a hollow shaft which is a bad conductor of heat and which can for example be mounted in a graphited sintered bush. Inside the housing 1, provided in its walls with a sound-damping heat-insulating medium, there is a sheet metal container 10 which is open to the front and upwards and downwards, in which are arranged grids, supporting frames or perforated sheets 6, 7, 8 and 9, on which the food stuffs to be treated are placed. Between the insulated housing 1 and the hood-like container 10 heating elements 17 are provided, by which the gases circulated by the fan 4 are heated.

The circulating gases advantageously flow through the grids, supporting frames or perforated sheets 6 to 9 from below as shown by the arrows in FIGS. 1 and 2 and in this way they bring the heat from the electric heating bodies 17 uniformly to the food stuffs placed on the grids. The gases, now thereby cooled, pass upwards to the fan 4 whereupon they are recirculated. In order to supply the necessary quantity of heat to the food stuffs in the shortest possible time, it is necessary for the heat exchange to occur at a very high velocity because, as is known, the specific heat of gases is only small and accordingly the necessary quantity of heat can only be transferred by an unusually high velocity of the circulating quantities of gas. In order to keep the gas temperature constant during the process, this temperature being critical and pre-set for each form of load, a temperature controller 14 is provided, which through a relay (not shown), switches on or off either the current for all the heating elements or for only some of them.

A removable pan 15 is provided in the lower part of the housing 1 to catch the juices or fat which fall. Also, according to requirements, sieves or guide plates could be arranged in the walls of the container to remove the particles which are picked up in the air stream and lead them to the pan 15. As during operation the volume of gas is increased by the added water vapour an exhaust pipe 16 is provided, which preferably leads to a chimney or discharge passage.

The individual bodies 11 and 18 to be heated are laid on the perforated sheets 8, 9 in layers that are not too thick. Large items such as for example chickens are stuck onto sharp pins 13 on special grids 6, while flat items such as for example slices of bread or schnitzels are laid between permeable vertical retaining grids 12. The actual temperature prevailing at any given moment inside the apparatus can be read on the thermometer 19. The door 3, preferably made up of several glass plates for visibility and heat insulation, also co-operates with a switch, not shown, which switches the current on and off on closing and opening of the door.

The apparatus is particularly suitable for the preparation of all food stuff of which the preparation is associated with removal of water. It is therefore suitable for all so-called roasting, grilling or baking processes. A particularly significant and unexpected effect of the invention from a qualitative point of view is obtained in the production of so-called pommes frites. Here it has been found that potato slices containing albumen or previously coated with a thin layer of albumen or egg-white behave differently from those pommes frites which are produced by roasting or by immersion in hot fat.

The outer skin of these slices or pieces of potato is made gas-tight by the hot current of air and on further heating this skin is then blown up by the steam that is generated inside, so that the resulting pommes frites have the appearance of small balloons. In the centre of this balloon the actual white potato core remains, whilst around the outside, a large distance away, there is formed a golden yellow roasted potato shell which has outstanding taste qualities as it has not come into contact with fat or with the floor of the pan at any stage. As this process is completed relatively rapid and the pommes frites thus produced are also usually rapidly consumed, the loss of the heat-sensitive ascorbic acid (vitamin C) is extremely low, i.e. potatoes prepared in this way have particularly high value both in taste and in nutrition.

FIG. 4 shows a potato slice in a fresh condition which, after the treatment described, has the appearance shown in FIG. 5 and has a crisp balloon-like skin 20 formed during this heat treatment.

Other results, likewise unexpected, are obtained with the process according the the invention applied to whole potatoes, subjected to temperatures from 300° C to 400° C. These do not form any skins but one obtains a potato having an outstanding taste similar to that obtained by roasting in hot ashes. The black coating which is produced by carbonisation of the skin can be consumed without harm. This manner of preparing potatoes, which is preferably only applied to potatoes of medium size, makes prior peeling unnecessary. It thus has substantial labour-saving and economic significance, especially in large kitchens.

Also for roasting biscuits or rusks, as for the production of baked goods, the method according to the invention has advantages in so far as, as a consequence of the exact separability of temperature and treatment time, the roasting process can be better controlled, allowing baked goods and bread to be given broad attractively tasting crusts without any fear of carbonising the outer extremities.

The grids of the apparatus should always only be loaded with foodstuffs of one kind, requiring the same treatment temperature.

The forms of apparatus according to the invention shown in FIGS. 6, 7, 11, 12 and 13 likewise comprise a heat-insulated housing 1 supported from the ground on feet 2. The roof of the housing is provided with a hole through which projects the shaft of the motor 5 that drives the fan 4 and is secured to the roof of the housing 1.

Into the space enclosed by the housing 1 there projects partially the adjustable thermal controller 14 serving to adjust and maintain the most favourable roasting temperature. In addition heating bodies 17 project into the interior of the housing 1. They are provided in the spaces formed between the two side walls of the housing 1 and the two side walls of the sheet metal container 10. The container 10 is open at the bottom, top and front and except for its rear face it is spaced away from the walls of the housing 1.

It is also provided with a measuring device 19 mounted to resist vibration and provided with a temperature sensing element, this device serving to determine the actual temperature of the gases circulated in the housing 1, preferably air or a steam/air mixture.

Figure 7:
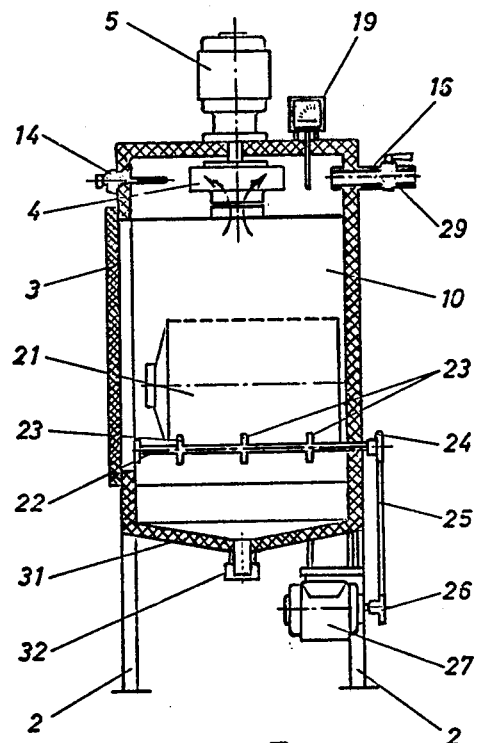
FIG. 7 is a section on the line I—I in FIG. 6.

In the apparatus illustrated in FIGS. 6 and 7 a gas-permeable drum 21 is arranged to rotate about a horizontal axis. For this there are provided two mutually parallel shafts 22 lying in a common horizontal plane and mounted rotatably in the housing 1, the shafts carrying friction rollers 23 on which the drum 21 rests with its cylindrical surface engaging the rollers. Each shaft 22 is provided on its free end, projecting through the back of the housing 1, with a sprocket 24 engaged by a respective roller link chain (bicycle chain) 25 driven by a pinion 26 connected to a motor 27. Thus the motor 27 drives the friction rollers 23 secured to the shafts 22 and thereby also drives the drum 21. The desired speed of rotation of the latter can be adjusted for example by suitable selection of the rollers 23, sprockets 24 and pinion 26 in relation to the circumference of the drum 21.

The housing 1 is provided at its front face with the heat-insulated door 3 which allows the insertion of the drum 21 in the sheet metal container forming a heating shaft. Surplus gases are discharged from the interior of the housing 1 through an exhaust pipe 16 provided with a control flap 29 and leading to the atmosphere or to a chimney. Steam and other gases, often having an unpleasant smell, are removed in this way without reaching the working area around the apparatus. Particles which break off the goods to be treated, and contained in the drum 21, and which pass through the openings in the wall of the drum, collect on the conical floor 31 of the housing 1. They can easily be removed as required, for example by washing out, through an opening in the floor provided with a screwed closure member 32.

In the apparatus according to FIGS. 6 and 7 air or an air/steam mixture is preferably circulated in the direction of the arrow shown, i.e. it is drawn upwards at high velocity from the shaft-like or channel-shaped container 10 and forced downwards towards the heating bodies 17, where the entry into the container 10 the drum 21 within it occurs. With the aid of the heating bodies 17 the circulating fluid medium is continuously maintained at the desired temperature, which can be adjusted by the controller 14 and read on the measuring instrument 19. Throughout the heat-treatment the drum 21 rotates continuously in the direction of the arrow in FIG. 6.

Figure 8:
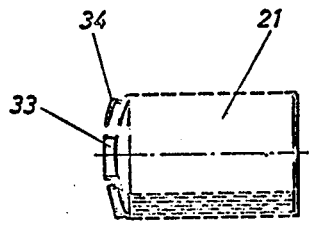
FIG. 8 is a longitudinal section through a drum for the apparatus of FIGS. 6 and 7.
Figure 9:
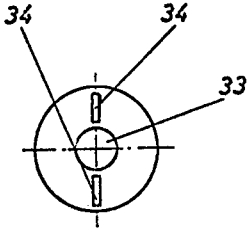
FIG. 9 is a front view of the drum of FIG. 8.
Figure 10:
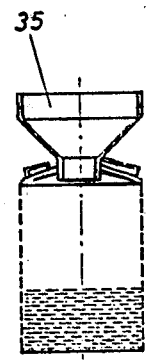
FIG. 10 is a longitudinal section through the drum of FIGS. 8 and 9 with a filling funnel in place for the goods to be treated.

The construction of the drum 21 can be seen from FIGS. 8, 9 and 10. At least its peripheral wall is gas-permeable and preferably comprises a closely woven wire mesh or gauze or a metal sheet closely perforated for example by punching. It is provided at the front with a closable filling opening 33 and two handles 34 to allow its easy removal from the housing 1 after opening the door 3. The drum 21 is best filled with the aid of a funnel, as shown in FIG. 10. The drum should only be filled about half-full, in order to ensure continuous tumbling of the goods within it during rotation of the drum 21 on the friction rollers 23. In order to prevent clearly the articles or particles of food to be treated from sticking, the drum 21 can be provided with an appropriate coating, for example of polytetrafluoroethylene.

Figure 11:
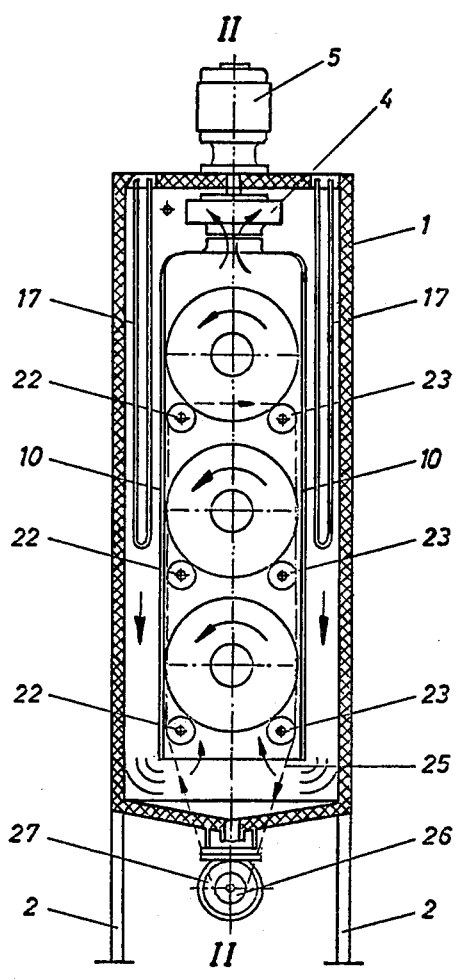
FIG. 11 is a section parallel to the front wall through apparatus according to the invention with several rotating drums for receiving individual items of food, the drums being arranged one above the other.
Figure 12:
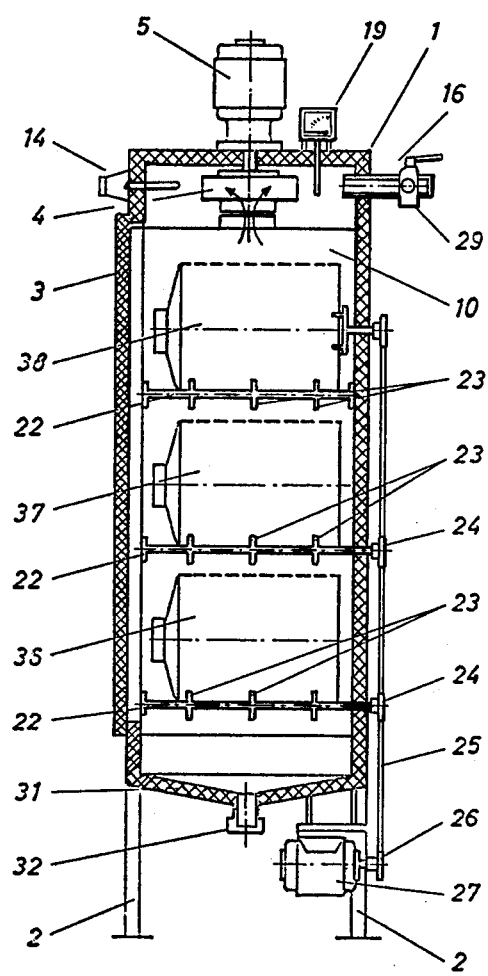
FIG. 12 is a section on the line II—II in FIG. 11.
Figure 13:
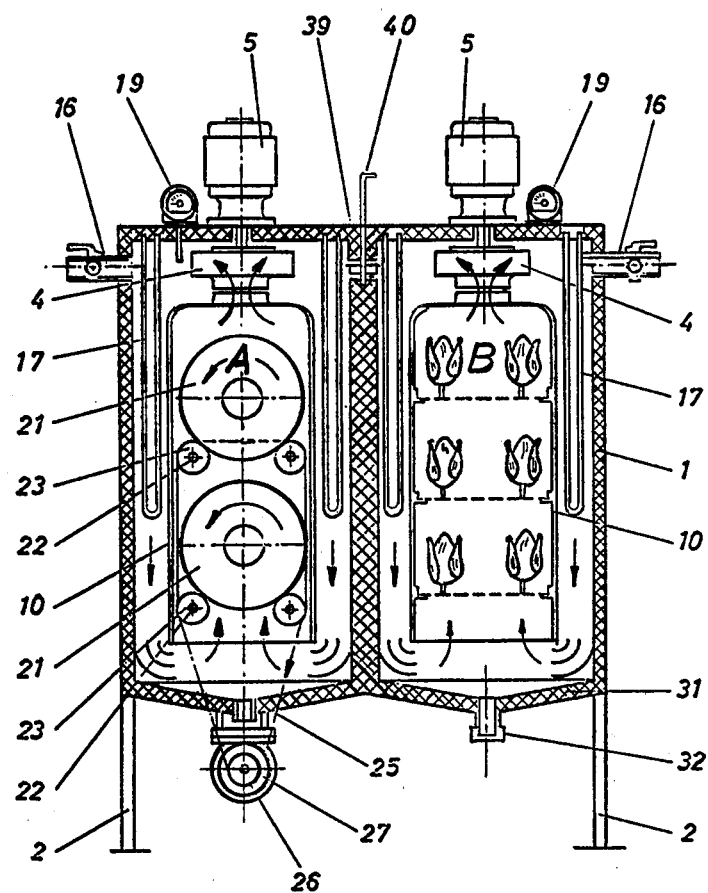
FIG. 13 is a section taken parallel to the front wall through apparatus according to the invention with super-imposed rotating drums and fixed means for receiving the food stuffs.

For larger throughputs the forms of apparatus illustrated in FIGS. 11 and 12 are especially suitable, with several drums 36, 37 and 38 arranged one above the other. However, the drums could also be arranged side by side instead. Large throughputs are necessary for example in catering establishments, which must always have freshly cooked goods available during meal times, for example roast potatoes or pieces of meat. The drums are accordingly filled and inserted into the apparatus in a time sequence so that freshly roasted goods are always available.

In the case of potatoes it takes for example about 5 to 15 minutes until they are ready, according the the expenditure of energy. It is, therefore, advantageous to fill the individual drums at intervals of about a quarter of an hour so that freshly roasted potatoes are always available at the desired moments. Moreover, with potatoes special care is required as all kinds of potatoes can only be kept crisp for about a quarter of an hour and thereafter they become soft and lost their taste.

In the apparatus designed for large throughput the drums are subjected to the same air or gas stream which preferably is a temperature between 120° and 160° C. The drums could advantageously, as shown in FIGS. 11 to 12, be arranged in the same container 10. The drums 36, 37, 38 are set in rotation by respective pairs of shafts 22 having friction rollers 23 and having sprockets 24 on those ends of the shafts which project through the rear wall of the housing, the sprockets being engaged by a common roller link chain driven from a pinion 26 connected to the motor 27 (FIG. 11). The driving of the drums could, however, also be done with the aid of a driving spindle which lies on the longitudinal axes of the drums when they rest on the rollers 23 and is rotatably mounted in the rear wall of the housing 1, the spindle engaging the drum inside the housing 1, through a suitable clutch or coupling and being connected outside the housing 1 to a driving motor, for example through a sprocket and chain. Such a drive is shown for the upper drum 38 in FIG. 12.

In FIGS. 11 and 12 the direction of the hot gases circulated by the fan 4 and the direction of rotation of the drums 36, 37, 38, are indicated by arrows.

Especially in the roasting of potatoes energy must be expended in order to vapourise the moisture contained in the goods to be treated. This energy can be at least partially recovered in that the air/steam mixture is used for treating foodstuffs in apparatus according to FIGS. 1 and 2. This occurs in apparatus constructed according to FIG. 13.

This comprises a constructional unit A with two drums 21 rotating about a horizontal axis and a constructional unit B constructed in accordance with FIGS. 1 and 2. The units A and B are formed into a common heat-insulated housing 1 and are separated from one another by a common dividing wall. Each unit comprises a shaft-shaped sheet metal container 10, a fan 4 with its driving motor 5, heating bodies 17 and measuring apparatus 19 and it is further provided with a conical floor 31 and a threaded floor opening 32 and a door 3, not shown.

While the unit A has two drums 21 in the container 10, mounted on the friction wheels 23 of respective pairs of shafts 22 and set in rotation by a driving motor 27, the unit B has three grids with vertical spits arranged one above another in the container 10, the spits being capable of receiving chickens for example. The dividing wall of the housing 1 is transversed by a connecting pipe 39 which can be opened or closed by slide 40 according to requirements. The unit A is provided with an exhaust pipe 16 and so is the unit B. The two pipes 16 are each provided with an adjustable closure flap in order to be able to set the most favourable conditions of temperature and gas circulation.

The vapour which is generated when the unit A is set in operation passes through the pipe 39 into the unit B and there it condenses and gives up its heat to the foodstuffs present there, which are thereby heated to nearly 80° or 90° C. During this period it is not necessary to supply heat energy to the unit B. The use of the heat of vapourisation arising in unit A in unit B saves energy. Also the water which is deposited on the poultry eliminates possible drying out, so that in this way the bird when prepared remains particularly rich in juices.

With the apparatus according to the invention of FIGS. 6 to 13, if appropriately fine-mesh drum walls are used, it is possible also to treat particularly small particles of meat of millimeter sizes, so that they are aromatised on all sides. Larger items of food can be made from these aromatised particles by pressing or sticking together with gelatine. These pieces are aromatised not only on their surfaces but also uniformly throughout their interiors. The powder-like aromatised particles of meat are also particularly suitable for the production of soups or as an addition to dishes of which the taste requires improvement.

By the use of the invention, especially the apparatus of FIGS. 6 to 13, the preparation of individual items of food is substantially simplified and furthermore, it allows the production of new forms of food with a particularly high proportion of aromatic materials and achieves a high degree of uniformity in the taste of the goods which are treated. Any desired combination of foodstuffs can be produced, for example pieces of potato could be treated in a mixture with pieces of meat, furthermore, small pieces of meat could also be mixed with pieces of bread and so on. Furthermore, the addition of any fat is entirely unnecessary. Finally, the effort involved in operation is reduced to a minimum.

Figures 14, 15:
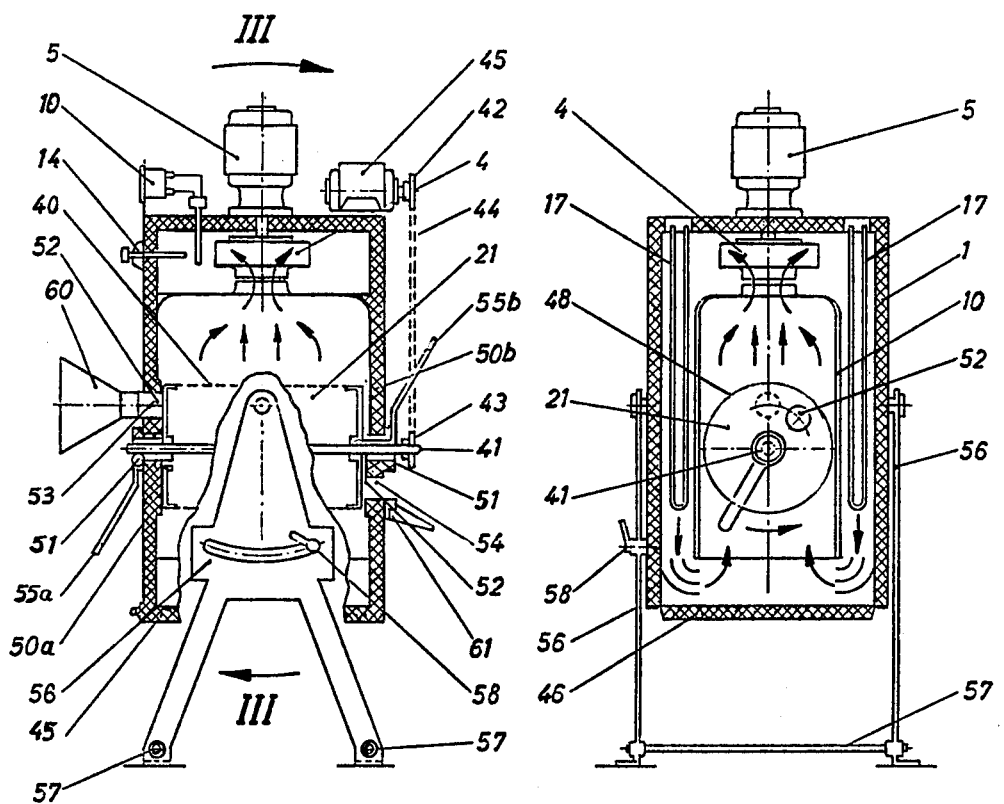
FIG. 14 is a vertical section through a tiltable device according to the invention with a rotating drum for receiving individual items of food, the section being along the axis of rotation of the drum and a portion of the heat-insulated housing being broken away to reveal its pivotal mounting.
FIG. 15 is a section on the line III—III in FIG. 14.
Figure 16:
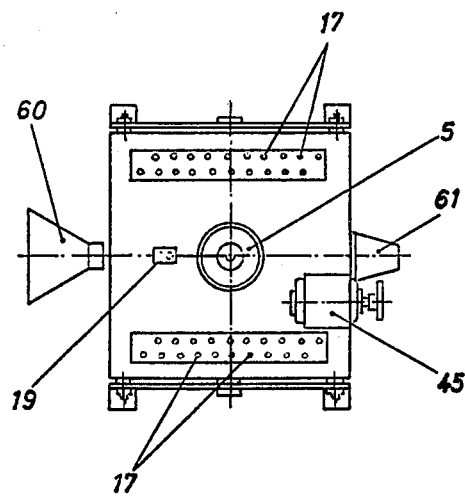
FIG. 16 is a view from above of the apparatus of FIGS. 14 and 15.

In the apparatus of FIGS. 14 to 16 there is likewise provided a heat-insulating housing 1 comprising two mutually spaced sheet metal layers including between them an intermediate layer of insulating material or alternatively it could be cast from fine pore heat-insulating concrete. Two batteries of rod-type heating elements 17 are arranged on both sides of the sheet metal container 1, in the respective spaces between this container and the adjacent side walls of the housing 1. Basically they can be electric rod-type heating elements however, primarily on economic grounds, heat exchangers could be provided instead, which are heated by the gases of combustion of hydrocarbon burners, the operating costs of the apparatus being reduced in this way by 20 to 30 percent according to the kind of fuel and the efficiency of the heat exchanger.

Mounted within the container 10 there is a drum 21 having a spindle 41 and serving to receive the goods to be treated. The drum 21 is driven through sprockets 42 and 43 and a roller link chain 44 from the driving motor 45. The sprockets 42, 43 engaging the chain 44 are keyed onto the shaft of the driving motor 45 and the spindle 41 of the drum.

While the motor 45 is preferably secured on the roof of the heat-insulating housing 1, the floor of the housing is provided with a flap 46 which is likewise heat-insulated which makes the interior of the housing 1 and the container 10 accessible, in particular for cleaning purposes and to allow insertion of the equipment mounted within it, for example the drum 21.

Figure 17:
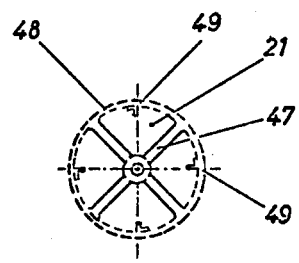
FIG. 17 is a section through the drum on the line IV—IV in FIG. 14.

As revealed especially clearly by FIGS. 14, 15 and 17, the drum 21 comprises two hubs in the form of crosses 47 at its end faces and a cylindrical surface 48 preferably made of strong woven wire of fine mesh or of perforated sheet and can be coated with moisture-repelling fluoro compounds or chrome-plated or nickel-plated. Furthermore, the cylindrical surface 48 of the drum can preferably be provided on its inner face with radially projecting baffles, for example metal strips 49 which ensure continuous intermixing of the items of food in the drum when it rotates so that it is made sure that all portions of the surfaces of the items of food attain the same temperature, which is of particular significance for obtaining outstanding qualities in the matter of taste.

The end faces of the drum 21 simply comprise two crosses 47 which are secured non-rotatably to the spindle 41. The drum 41 is therefore open at both ends and can thus be filled or emptied through them.

Opposite each open end face of the drum 21 there is provided on the inside of the adjacent wall of the housing 1 a respective rotary disc 50a or 50b of sheet metal, each provided with a hub 51 serving simultaneously as a bearing for the drum spindle 41 and allowing rotation of the discs 50a and 50b in the side wall of the housing. Each disc has a through bore 52. At the same spacing there is provided in the walls of the housing 1 which support the discs 50a and 50b a respective loading opening 53 and discharge opening 54. The opening 53 for loading of the goods to be treated lies above the spindle 41 of the drum while the opening 54 for removal of the treated material is arranged in the region of the lowest point of the periphery of the drum 21. These openings are capable of being closed by means of the rotary discs 50a and 50b. They are open when the bore 52 in the disc 50a is aligned with the opening 53 and the opening 52 in the disc 50b is aligned with the opening 54 and they are closed when the said bores and openings do not overlap. The discs 50a and 50b are provided with handles 55a and 55b for operating them from outside the housing 1.

In addition, for loading and emptying the drum 21 the housing 1 is mounted to tilt about an axis perpendicular to the axis of rotation 41 of the drum and in fact it tilts in a supporting frame formed substantially from two parallel plates 56 connected together by spacing bars 57. The direction of tilt is shown by two arrows in FIG. 14. From this figure and from FIG. 15 can also be seen a clamping device 58 which allows the housing 1 to be secured in the operative position illustrated in FIGS. 14 and 15 and in the tilted loading and emptying position (not shown), in which the clamping device 58 is at the left-hand end of the slot 59 in the side plate 56 in FIG. 14.

In the apparatus according to the invention illustrated in FIGS. 14 to 16 the housing 1 can be tilted in the frame 56, 57 away from the vertically operative position of FIGS. 14 to 15 through an angle of up to 90° so that in the loading and emptying position the housing 1 lies horizontally and the drum 21 is vertical and so the loading opening 53 of the housing 1 is uppermost and the discharge opening 54 of the housing 1 is at the bottom.

Instead of this it is, however, also possibly simple to provide an opening 53 in the side wall of the housing 1 serving both for loading and emptying. The drum 21 then only needs to have one end face open and also only one rotary disc 50a is needed. However, the housing 1 must then be mounted in the frame 56, 57, to be capable of tilting through 180°.

To simplify the loading of the weighed out items of food to be treated into the drum 21 a funnel 60 can be fitted into the filling opening 53 after the housing 1 has been tilted to the filling position. For the discharge opening 54 which lies lower down, such a funnel is not necessary. There a chute 61 is simply provided to guide the treated goods into a vessel underneath.

To circulate the air or super heated steam present in the housing 1 there is provided a blower 4 driven by the motor 5 which draws in the air or super heated steam from the interior of the container 10 as indicated by the arrows in FIGS. 14 to 15, passes it to the electric heating rods or the gas-heated heat exchangers 17 and the heated gases are then forced from below through the porous drum 21, filling the entire cross-section of the container 10, complete with the goods to be treated in the drum. A temperature measuring device 19 and an adjustable controller 14 act through relays (not shown) to set the most favourable treatment temperature for the goods in question and to maintain the temperature constant and monitor it.

For loading the apparatus the housing 1 is tilted from the position shown in FIGS. 14 and 15 into a practically horizontal position, then the disc 50a is turned by means of the lever 55a until its bore 52 is aligned with the opening 53 in the housing 1. The funnel 60 is put into the opening 53 and the drum 21 is loaded. During these steps the heating is switched off, but the rotation of the drum 21 does not have to be halted. After removal of the funnel 60 and closing the opening 53 by rotating the disc 50a, the housing 1 is tilted back to the operative position illustrated in FIGS. 14 and 15, the drum 21 is set in motion again if it had been stopped and the heating and the blower are switched on.

The heat treatment in the apparatus according to the invention, i.e. the grilling or roasting, now proceeds. As soon as the pre-pre-set treatment period, which is different for various foodstuffs, is ended and the entire contents of the drum 21 have been uniformly cooked, the supply of current to the blower moter 5 and the supply of energy to the heating rods or heat exchangers 17 is interupted by a time switch. For removing the treated goods from the drum 21 the housing 1 is then tilted again to the substantially horizontal position and then the opening 54 in the housing 1 is opened by rotating the disc 50b, i.e. by lining up its bore 52 with the opening 54, without interupting the rotation of the drum 21. The treated material pours out into a vessel, not shown, placed under the chute 61. After the opening 54 has been closed and the opening 53 has been re-opened, the drum 21 can immediately be loaded again without altering the position of the housing 1.

In the apparatus according to FIGS. 14 to 16 the handling times (the time taken in loading and emptying the drum 21) are substantially shorter than those of the apparatus of FIGS. 6 to 13 and in addition the amount of work that is required is substantially simplified because it is no longer necessary to exchange the drums. Associated with this there is also a saving in energy that is by no means negligible.

Accordingly the apparatus of FIGS. 14 to 16 is particularly suitable for all food-preparation processes of an industrial nature, i.e. undertaken on a large scale, and above all it is suitable for the economical manufacture of potato chips, i.e. thin roasted slices of potato.

It has been found that outstandingly tasty and crisp potato chips can be produced by providing between the cutting-up stage and the actual roasting process a brief period of heating in boiling water. In the boiling water the small quantities of albumen in the slices of potato coagulate, and form the gas-impermeable skin 20, mentioned earlier, on the surface of the slice. In the subsequent heating process, preferably to a temperature between a heated rapidly flowing gas, preferably air or superheated steam, steam is generated inside the slice of potato and acts to blow out the skin of the slice so that the finished potato chips take on the shape of small flat hard balloons which are particularly pleasant to eat.

One should start with raw potato slices as far as possible of the same size and shape, about 2 to 3 mm thick and with an average diameter of about 15 to 20 mm. In the production of potato chips according to the invention they are completely dried and aromatised. As a consequence of the heating, preferably with air or superheated steam, they do not take up any contamination, as is the case for example in those potato chips produced by frying in hot fat. The chips produced according to the invention have the natural taste of the potato and can be kept in the open for almost unlimited periods, in contrast to normal potato chips in which, with a fat content of almost 50% by weight, butyric acids form within a few weeks, giving them a rancid taste and making them unpalatable.

According to the invention onions can also be treated, i.e. roasted, with heated high-velocity gases, preferably with high velocity steam for 7 to 15 minutes at temperatures between 105° C and 110° C, leading to very aromatic and tasty products. Hitherto roast onions could not be offered as a luxury food or tit-bit because the fat used in frying masked the onion taste and made the onions unpalatable and moreover on roasting in pans the necessary critical temperatures and times could not be attained.

However, according to the invention not only can onion preserves of outstanding taste be produced, but also meat preserves. It has been found that a large surface area of the pieces of meat to be treated is of great significance and that the piece of meat to be roasted is preferably cut up into a large number of small flat slices. In the treatment according to the invention juices from the slices of meat migrate to the surface of the slice and their residues are converted under the effect of the superheated dry steam in a straight-forward manner into taste-giving and aroma-giving materials that remain on the surface. Depending on the kind of meat to be treated the treatment time is limited to 7 to 10 minutes and the temperature is between 160 and 180° C. If the items of meat treated in accordance with the invention are not for immediate consumption but are to be preserved out of contact with the air, then later, after the actual aromatising process, a drying process or similar process should follow at substantially lower temperatures. It is characteristic of the meat items treated in accordance with the invention that they can be chewed for longer until all the taste has been extracted, which is advantageous on physiological dietetic grounds and for good digestion.

The best results in the above-mentioned production of potato chips, roast onions and grilled meat in the manner according to the invention are achieved if one uses gas-permeable drums rotating about a horizontal axis, i.e. apparatus according to FIGS. 6 to 13 or apparatus according to FIGS. 14 to 16. The use of such apparatus is therefore preferred.

In the apparatus according to the invention use is preferably made of devices according to FIGS. 18 to 23 to receive large items of food, especially poultry.

Figure 18:
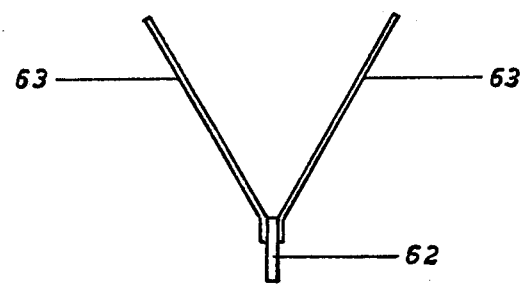
FIGS. 18 and 19 show a mounting frame comprising four wires for receiving small items of poultry.
Figure 19:
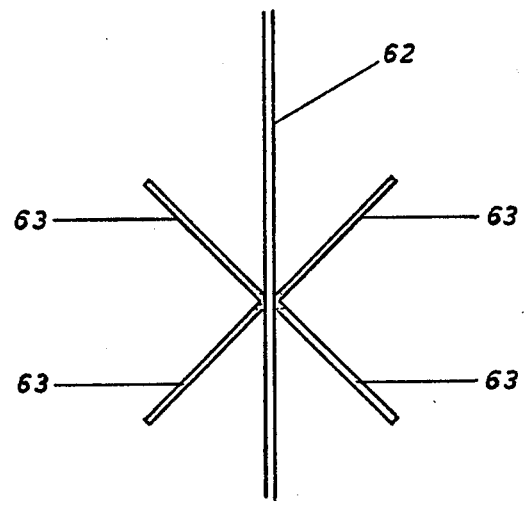
Figure 22:
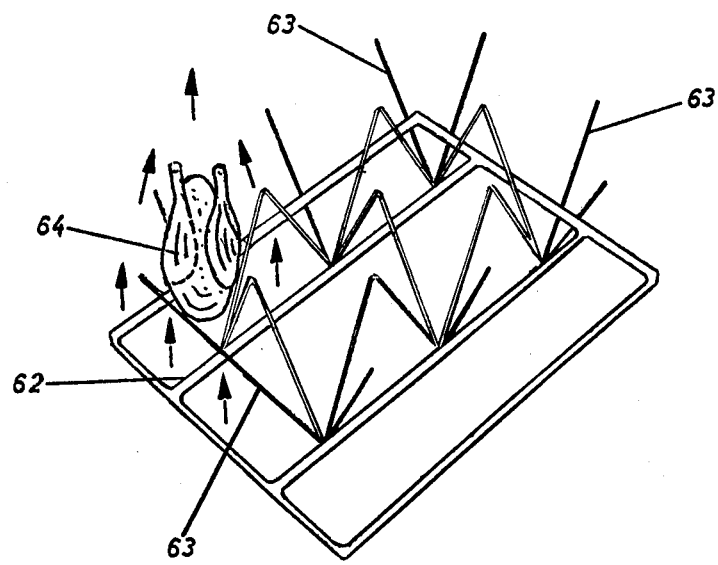
FIG. 22 shows a complete grid with several frames according to FIGS. 18 and 19, with one chicken in position.

According to FIGS. 18, 19 and 22 four wires 63 are welded to the transverse grid bar 62. The chicken 64 is laid in the frame thus formed and, as indicated by the arrows in FIG. 22, the chicken is washed over by a hot stream of gas. Several such wire frames are arranged on the crossbar 62 and a number of such bars go to form a grid which can be inserted horizontally from the side into the container 10 of the apparatus of FIGS. 1 to 3 and 13. For ease of manufacture adjacent wires of adjacent frames can be formed in one piece.

Figure 20:
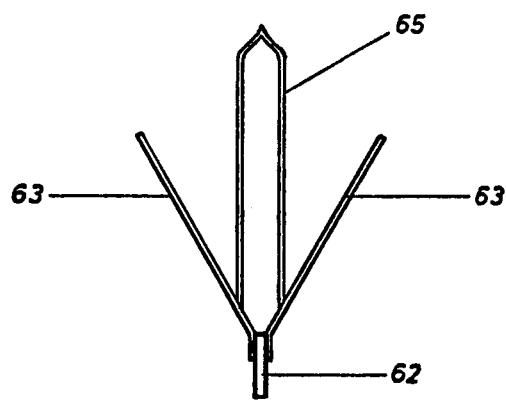
FIGS. 20 and 21 show the frame of FIGS. 18 and 19 provided with a central hollow spit to receive larger birds.
Figure 21:
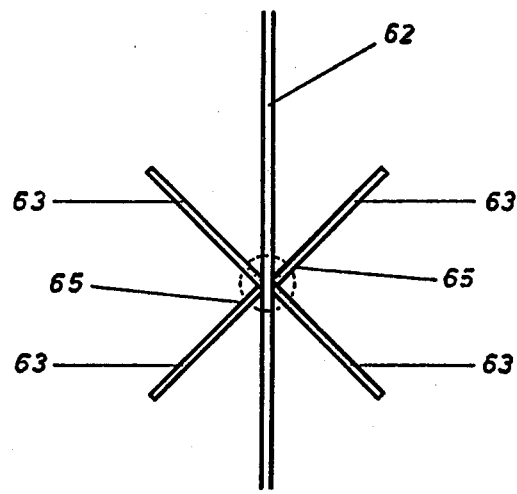
Figure 23:
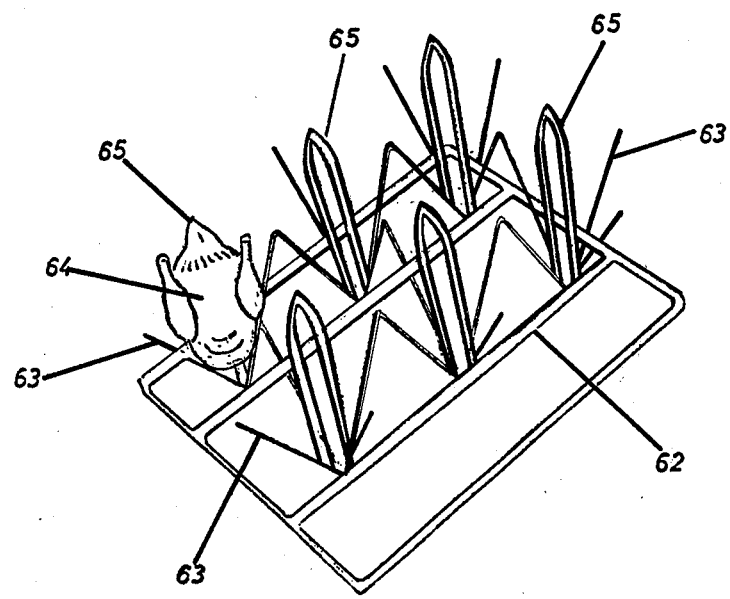
FIG. 23 shows a complete grid with several frames according to FIGS. 20 and 21, with one chicken in place.

In order to cut down the grilling time a spike 65 made up for example of four vertical wires can be welded into the centre of each frame as shown in FIGS. 20, 21, and 23. At their upper ends the four wires come to a point which is used to transfix the bird. In this way the stream of hot gas not only washes over the outside of the chicken but also passes through it.

The rotating spit known in existing devices is not necessary as uniform heating is ensured not only by the movement of the hot air but also by the manner in which the items of poultry are arranged.

Particularly favourable products are obtained in accordance with the invention if the fat that drips from the foodstuffs during their heating is collected and removed before it reaches its decomposition temperature. This can be achieved in the ways shown in FIGS. 24 to 28.

Figure 24:
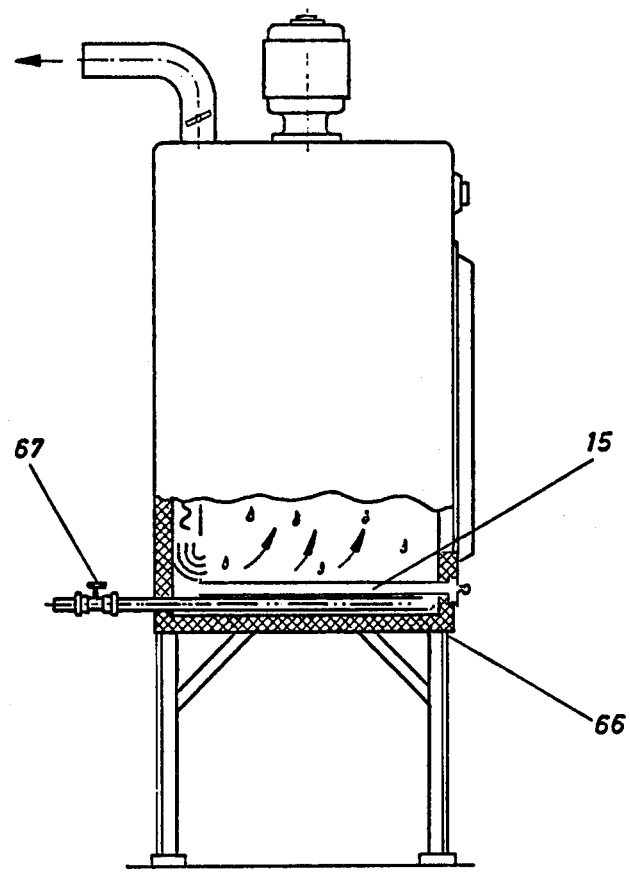
FIG. 24 is a side view of apparatus according to the invention, partially broken away to reveal the means for collecting the fat.
Figure 25:
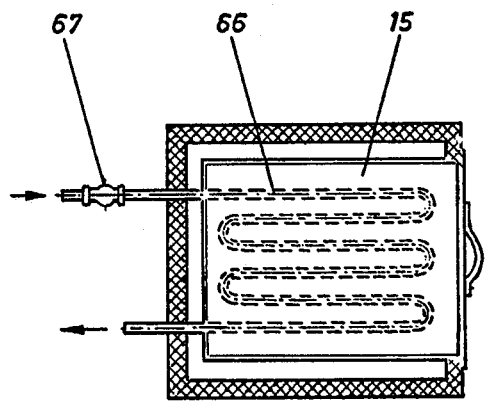
FIG. 25 is a cross-section through the broken-away portion of the apparatus of FIG. 24.

As seen in FIGS. 24 and 25, a cooling device is arranged below the removable pan 15, in the form of a meandering thin pipe 66 which is preferably insulated from below and which serves as a support for the pan 15. The cooling pipe has tap water passing through it, the flow being controlled by a cock 67. One could use flat hollow bodies of sheet metal instead of the pipe. The temperature of the pan 15 and of the fat collected in it is dependent on the quantity of water flowing through the cooling system in unit time. By appropriate adjustment of the cock 67 one preferably selects that temperature at which one the one hand there is no breakdown of the fat but on the other hand there is no unnecessary heat loss by excessive cooling of the grilling space. Thus in practice the setting of this device is extremely simple; after the most favourable setting for the water flow has been determined once and for all, the only handling needed is the removal and emptying of the pan.

Figure 26:
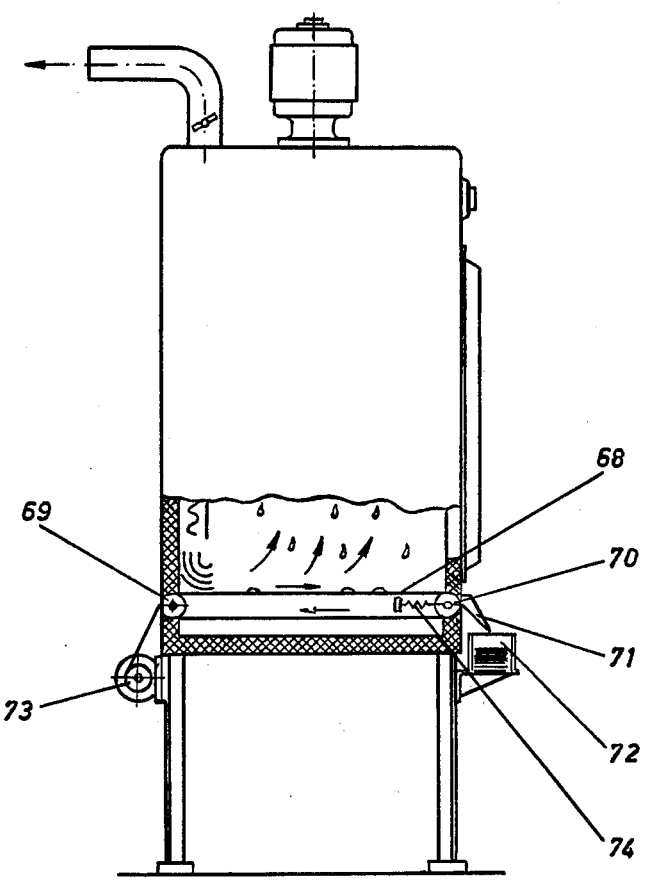
FIG. 26 is a side view of apparatus according to the invention, partially broken away to reveal a second form of fat-collecting means.
Figure 27:
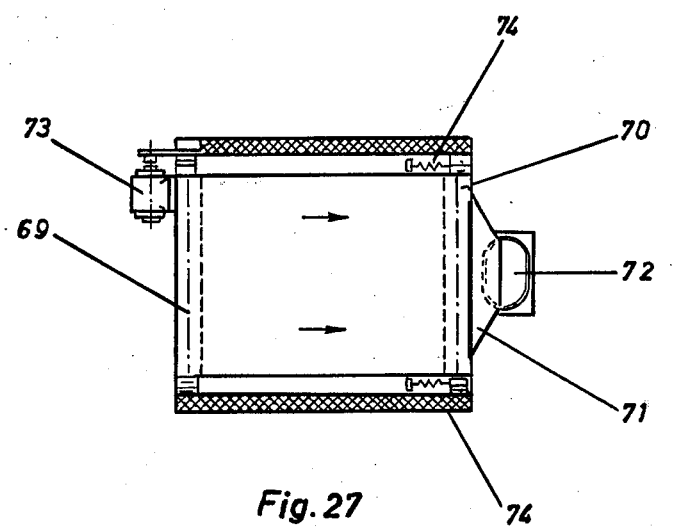
FIG. 27 is a cross-section through the broken away portion of the apparatus of FIG. 26.

FIGS. 26 and 27 show an arrangement in which the fat falls onto an endless belt 68 which moves continuously over two flat rollers 69 and 70 in the direction of the arrow and carries the fat that falls on it to a stripper blade 71 placed at the roller 70, from which it falls into a vessel 72. The conveyor belt 68 is driven by a motor with reduction gear 73 and is kept under tension by two springs 74. Here again, by suitable selection of the speed, it is possible to keep the temperature of the belt below the decomposition temperature of the fat. In contrast to the arrangement of FIGS. 24 and 25 no water supply is needed and the periodic removal and emptying of the pan are eliminated. A combination of the arrangements of FIGS. 24 and 25 and of FIGS. 26 and 27 could be made, in which a suitably cooled floor surface has a scraper, somewhat like that used in car windscreen wipers, mounted on it and the scraper moves back and forth and continuously delivers the fat to a discharge opening.

Figure 28:
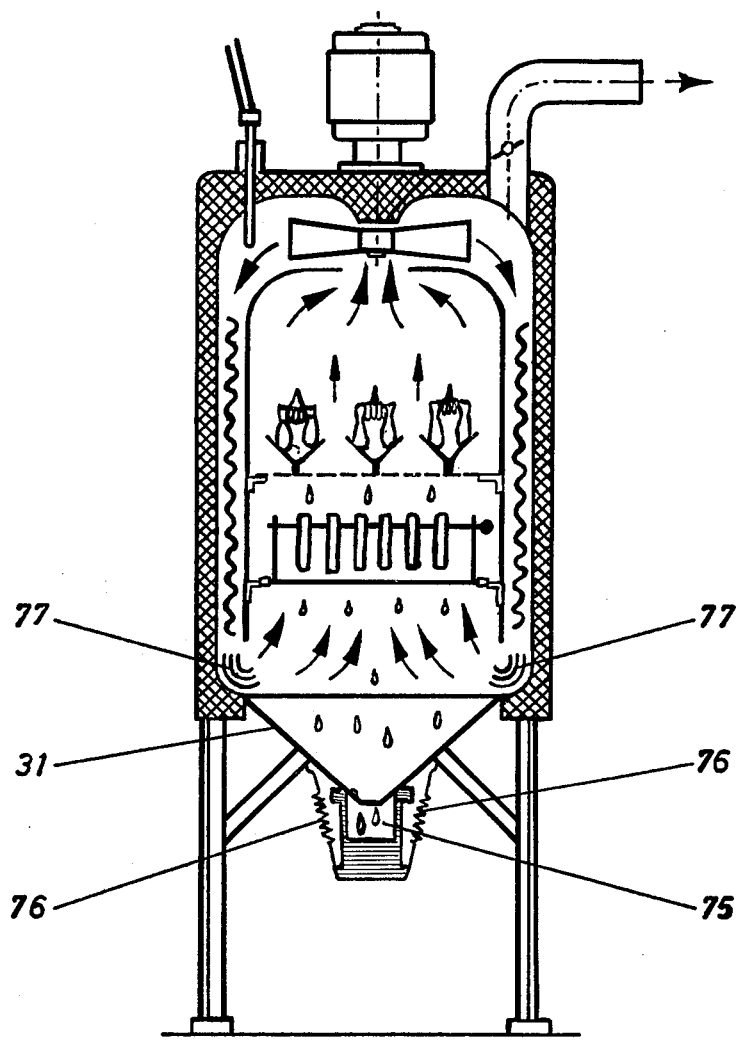
FIG. 28 shows a section parallel to the front wall through apparatus according to the invention with fixed means for receiving the food stuffs and with a third form of fat-collecting means.

In the embodiment of FIG. 28 the floor 31 of the grilling space is funnel-shaped. The drops of fat pass through an opening into a receiving vessel 75 which is pressed by springs 76 against a flange around the opening, with the interposition of a seal. Preferably the vessel 75 is transparent so that the quantity of fat emulsion in it, which can be used for making meat sauces or gravy and so on, can be observed. By a small amount of heat insulation with respect to atmosphere the temperature of the funnel-shaped floor can be kept at such a value that the fat falling on it cannot become decomposed, while at the same time the fat is not allowed to solidify and unnecessary removal of heat from the grilling space is avoided. Flow-guiding plates 77 prevent the fluid from the vessel 75 being drawn back up again into the grilling space and also they help to separate the fluid from the circulating stream of gas.

The forms of apparatus according to FIGS. 24 to 28 have the advantage that the development of tarry vapours with their disadvantages to the user is prevented by the exhaust pipes and chimneys. The food stuffs to be grilled are much more uniformly browned as no decomposing fat is deposited on their surfaces. Finally there is the further advantage that the broths or juices that are deposited can be used for the preparation of other dishes.

Figure 29:
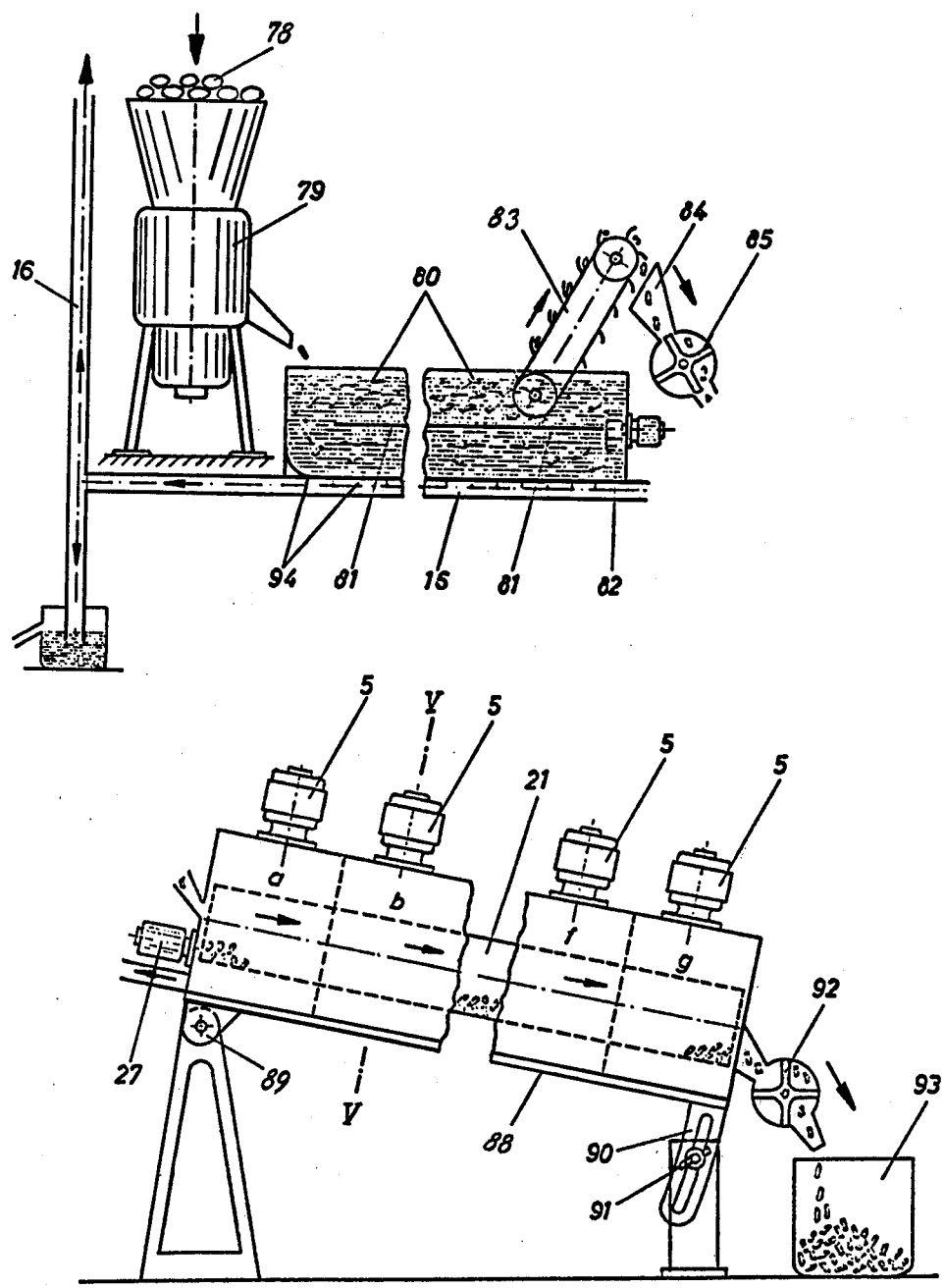
FIG. 29 shows a longitudinal section through a continuously operating installation according to the invention with a rotating drum for receiving the individual items of food stuff to be treated.
Figure 30:
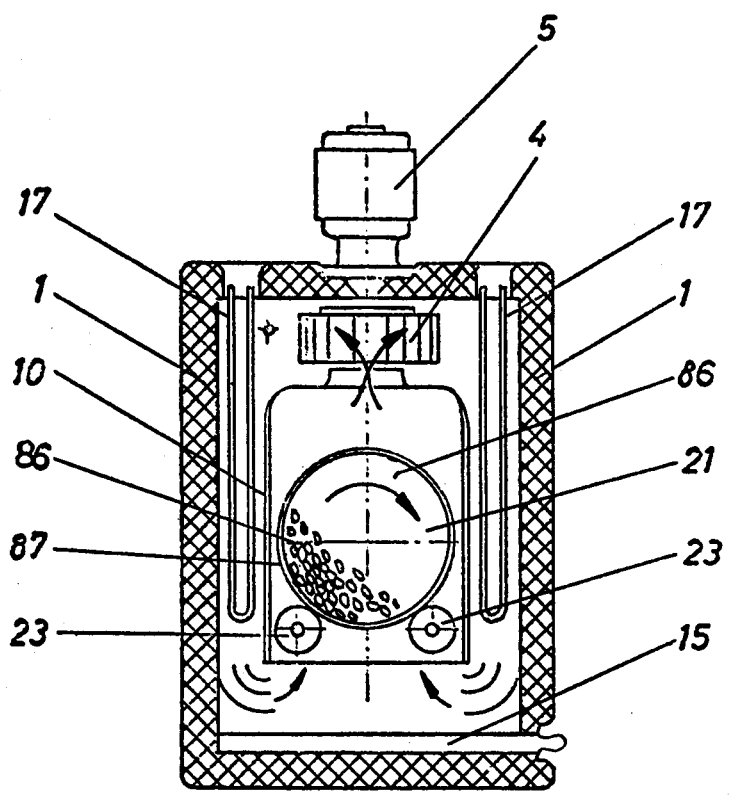
FIG. 30 is a section on the line V—V in FIG. 29.

In FIGS. 29 and 30 there is illustrated an installation which allows the continuous heat treatment of individual items of food and is especially suitable for the continuous treatment of potatoes.

The potatoes 78 to be used in producing pommes souffle, peeled and preferably cut in strips according to their length, are preferably cut up in a normal potato chipper 79 into small thumb-nail-sized slices, 2 to 3 mm thick. They then pass into the blanching vessel 80 filled with boiling water and several meters long. This vessel has a removable sheet metal division 81 at its midpoint with openings in both faces. The aim of this division is to keep the liquid in the vessel flowing in a laminar manner by the use of a circulating pump 82, as indicated by the arrow.

By this arrangement the fluid and the material that falls into it on simultaneous heating and blanching is fed to a conveyor belt 83 provided with sieve-like buckets which remove the floating pieces of potato from the belt, lift them up and tip them into the funnel 84. The buckets on the belt conveyor are made of woven wire to allow the water that is picked up with the pieces of potato to fall away as the potatoes are lifted. From the funnel 84 the slices fall into a kind of paddle wheel gas lock which has the purpose of feeding the slices onwards without allowing the steam present in the drum space to escape at this point.

The pieces of potato now pass to the upper end of the rotating wire drum 21 which can with advantage be made up of roughly half-meter-long cylindrical wire bodies linked together. The wire drum 21 is provided inside with stirring plates or baffles 86 as shown in FIG. 30 and it rests on the disc-like rollers 23 which do not prevent the flow of air. These rollers are rotated by the driving motor 27. The drum 21 and the driving rollers 23 are in the sheet metal container 10 enclosed in the insulated housing 1. Between the container 10 and the housing 1 are electric heating elements 17 and above the container 10, which has an opening at the top, there is mounted the blower 4 driven by the motor 5. The aim of this arrangement is to allow the air, heated by the element 17, to flow at high velocity (2–10 m/sec) in a circular path through the wire drum 21 transverse to its axis and thus rapidly to dry the material 87 which is continuously changing its position in the drum, to roast the material and if necessary to aromatise it, a process which is important for the successful employment of the method. At the floor of the housing 1 there is a removable pan 15 serving to remove from the apparatus any particles which may happen to fall.

It has been found advantageous to heat the wire drum 21, which is from 4 to 10 meters long, by several of the devices ($a, b, f, g$) illustrated in order to have the possibility of controlling easily the energy consumption at different points in the drum, which is different. For example at the start of the process where a lot of water must be vapourised, larger quantities of energy are required than near the end of the process, i.e. at the outlet end of the drum 21, where one is only doing a final drying and if necessary aromatising process. The units are therefore preferably independent, each having a different number of heating elements and also temperature control and regulating means in order to keep a continuous check on the very critical temperatures during the process and to maintain them. These units are preferably mounted on a carrier 88 which has a hinge 89 and by means of two stays 90 provided with slotted holes and a screw 91 they can be adjusted to the most favourable inclination for the process time.

The ready-cooked chips leaving the drum fall into a paddle wheel lock 92 like that at the entrance end and from here, without any undesired escape of water vapour, they pass into a receiver 93 or, even better, from there they pass into a weighing and packing machine (not shown) which packs the chips into the usual kind of plastic bags.

The water vapour produced during treatment of the goods, which is by no means negligible and generally amounts to more than four-fifths of the weight of the potatoes consumed, escapes into the atmosphere through an exhaust pipe 16 after it has first been used for pre-heating. It has been found particularly favourable for this vapour at about 150° C to be guided around the blanching pan 80, which is provided with fins 94, in order at least in this way to give up part of its energy as heating energy for the water in the blanching pan, which is continuously being cooled by the arrival of fresh material. The resulting condensate flows away through valves in a known manner.

As already indicated in the introduction the installation of FIGS. 29 and 30 produces unexpectedly uniform, tasty and extremely attractive pommes souffles which even without being in packages can be stored almost as long as desired and only take up water from the atmosphere after long periods of time. Thanks to this feature they are suitable for adding to soups without rapidly losing their crisp character. If they are accompanied by fat-free meat extract or similar seasoning their tastiness is still further increased as they contain substantially nothing but potato, in particular no fat which could become rancid as is true of the fried chips known hitherto. For this reason in particular their life is almost unlimited and also their value on health grounds exceeds by far that of the kind prepared in hot fat, which hitherto have contained up to half their weight in indigestible fats.

In the installation illustrated in FIGS. 29 and 30 the heating devices are electric. It will be clear they could be replaced by suitable gas of liquid hydro-carbon operated heat exchangers which reduce the not insubstantial heating costs of this process by about half as these energy sources are cheaper at the present time. The consumption of heat needed to eliminate the water can however also be reduced if one feeds additional atmospheric air continuously into the drying space, either drawn direct from the atmosphere and heated by the elements arranged inside the drying space or pre-heated correspondingly by the exhaust gases passing out of the drying space. In this way use is additionally made of the principle of material transfer, i.e. a part of the potato water is taken up and carried along directly by the unsaturated air that passes rapidly over the pieces of potato and so it does not need to be vaporised by the additional supply of heat.

The invention is therefore of great value not only on physiological dietetic grounds but also from an economic point of view in that it provides a new use for the potato, the consumption of which has dropped off, as is known, quite substantially in recent years.

It will be evident that the invention can be employed for all fragile food stuffs to be produced in quantity, which includes not only the usual drying but also a roasting or aromatising process. It is also suitable for grilling or roasting small flat pieces of meat continuously to a tasty condition or for browning slices of onion in which the treatment temperatures (105° to 110° C) and the treatment times are particularly critical. It also allows the continuous preparation of slices of hard fruits (apples, pears and so on) in a tasty manner and above all also for roasting coffee, barley grains (malt) and popcorn.

I claim:

1. Apparatus for heat-treating foodstuffs, comprising a heat-insulated housing with a door and a sheet metal container mounted in and open below and above and at the side which faces the door, the container being spaced from the walls of the housing at least above and on both sides, further comprising a blower arranged in the space between the roof of the housing and the upper opening in the container and heating elements in the space between the side walls of the housing and the container and a temperature controller for maintaining the pre-set treatment temperature characterised in that, at least one gas-permeable drum is mounted in the container for rotation about a horizontal axis to receive the goods to be treated, the drum being connected to driving means.

2. Apparatus according to claim 1 characterised in that each drum is detachably mounted and is detachably connected to its associated drive.

3. Apparatus according to claim 1 characterised in that the drum is mounted on rotatable driving rollers.

4. Apparatus according to claim 1 characterised in that, the drum is connected to a driving spindle through a clutch or coupling at its rear face.

5. Apparatus according to claim 1 characterised in that the drum has a peripheral wall of fine mesh perforated sheet.

6. Apparatus according to claim 1 characterised in that the drum has a peripheral wall of fine mesh woven wire.

7. Apparatus according to claim 1 characterised in that the drum is provided with a coating of polytetrafluoroethylene.

8. Apparatus according to claim 1 characterised in that several drums are arranged in the container one above the other.

9. Apparatus according to claim 1 characterised in that several drums are provided in the container arranged along side one another.

10. Apparatus according to claim 1 characterised in that a second heat-insulated housing unit is provided for heat-treating foodstuffs, said second unit being connected to the first-recited heat-insulated housing to receive the exhaust gases therefrom.

11. Apparatus according to claim 1 characterised in that the door cooperates with a switch that breaks the current when the door is open.

12. Apparatus according to claim 1 characterised in that a take-off pipe is provided for the vapours which arise.

13. Apparatus according to claim 1 characterised in that the drum is open at at least one end face and the heat-insulated housing has a closable opening for the insertion and possibly removal of foodstuffs in the region of the open end face of the drum at about the height of the axis of rotation of the drum or above it.

14. Apparatus according to claim 13 characterised in that the drum is open at both end faces and the heat-insulated housing has a closable opening in the region of each open end face of the drum, the opening for the insertion of the food lying at about the height of the axis of rotation of the drum or above it and the opening for removal of the food being arranged at about the height of the lowest point of the periphery of the drum.

15. Apparatus according to claim 13 characterised in that the housing is mounted to rotate about an axis perpendicular to the axis or rotation of the drum.

16. Apparatus according to claim 15 characterised in that the housing is capable of being secured in the filling and emptying position of the drum.

17. Apparatus according to claim 13 characterised in that the openings are each capable of being closed by a rotary disc with a through passage rotatably mounted in the housing and operable from outside the housing.

18. Apparatus according to claim 13 characterised in that the housing is provided with a floor flap preferably heat-insulated.

19. Apparatus according to claim 13 characterised in that the drum is connected through sprockets and a chain to a driving motor preferably mounted on the roof of the housing.

20. Apparatus according to claim 1 characterised by a removable drip catcher and a cooling device which is mounted below it and only cools the container far enough to prevent the fat collected in it from decomposing.

21. Apparatus according to claim 20 characterised in that the receiving container comprises a flat pan which closes off the lower part of the grill space and is cooled from below by water of a predetermined temperature or flow velocity.

22. Apparatus according to claim 20 characterised in that the gas stream is kept away from the floor of the grill space by guide plates.

23. Apparatus according to claim 20 characterised in that all the parts which come into contact with fat are coated with polytetrafluoroethylene or similar materials to prevent the fat sticking to them.

24. Apparatus according to claim 1 characterised in that the fat dripping onto the floor from the food is removed from the heating zone by a mechanical scraper.

25. Apparatus according to claim 1 characterised in that a continuously moving floor conducts the falling fat out of the heating zone into a receiving vessel.

26. Apparatus according to claim 1 characterised in that the floor has the shape of a funnel which is cooled by the outside air and leads into a receiving vessel serving to collect the fat dripping from the food.

27. Apparatus for heat-treating foodstuffs, comprising a heat-insulated housing with a door and a sheet metal container mounted in it and open below and above and at that side which faces the door, the container being spaced away from the walls of the housing on all sides, further comprising a blower aranged in the space between the roof of the housing and the upper opening in the container, and heating elements in the space between the side wall of the housing and the container and a temperature controller for maintaining the pre-set treatment temperature, characterised by upwardly divergent wire frames to receive individual birds with their heads downwards.

28. Apparatus according to claim 27 characterised in that said frames include a central hollow spit comprising at least three wires and transfixing the bird.

29. Apparatus according to claim 27 characterised in that a number of frames are combined to form a grid unit for insertion in the container.

30. Equipment for heat-treating foodstuffs characterised in that a conventional food chopper is followed by a hot water bath with a circulating pump, at the outlet end of which is arranged a bucket elevator at the discharge end of which there is provided a funnel connected through a paddle wheel gas lock to the roasting apparatus which has a cylindrical wire drum inclined towards its outlet end and enclosed over a region of about 270° C by a covering which is spaced away from the enclosing wall of the housing and is provided on both sides with heating bodies and over the opening on the upper side of which there is arranged a fan which is driven by a motor and forces the air heated by the heating elements vertically through the roating drum driven by a motor.

31. Equipment according to claim 30 characterised in that the water bath connected ahead of the roasting drum is provided at its half-full height with a removable sheet metal floor which has passages at both end faces of the water bath.

32. Equipment according to claim 31 characterised in that the exhaust pipe leading out of the roasting drum is led below the water pan to heat the water bath.

33. Equipment according to claim 30 characterised in that the wire drum is mounted rotatably on rolling discs driven by the motor, the heating and air-circulating means comprise several units and the supply and removal of the goods is achieved by rotating gas-tight paddle wheel locks.

34. Equipment according to claim 30 characterised in that the various units are capable of being heated independently of one another.

35. Equipment according to claim 30 characterised in that the various units can also be heated by gas with the aid of suitable heat-exchangers instead of by electricity.

36. Equipment according to claim 30 characterised in that continuously pre-heated fresh air is led into the circuit in the drying and aromatising process.

37. Apparatus for heat-treating foodstuffs, comprising; a heat insulated housing with a door; a container mounted within said housing, and open at its upper and lower ends and on the side thereof facing said door, said container being spaced from the walls of said housing at least at the upper end and on both sides thereof; a blower mounted in said space between the upper wall of said housing and said upper open end of said container; heating element means mounted in the said space between the sidewalls of said housing and said container; a temperature controller arranged and operable for maintaining a pre-set treatment temperature within said apparatus; at least one gas permeable drum mounted within said container for rotation about a horizontal axis, and adapted to receive foodstuffs to be treated; and drive means connected with said drum, operable to effect rotation thereof.

38. Apparaus for heat-treating foodstuffs, comprising: a heat insulated housing with a door; a container mounted within said housing, and open at its upper and lower ends and on the side thereof facing said door, said open upper and lower ends of said container being substantially unobstructed whereby substantially free flow of gases therethrough is made possible, and said container being spaced from the walls of said housing at least at the upper and lower ends and on both sides thereof; a blower mounted in the said space between the upper wall of said housing and said upper open end of said container, and adapted when operating to establish a continuous and substantially unobstructed high volume flow of gases downwardly through the said space between the sidewalls of said housing and said container, through said substantially unobstructed open lower end of said container, and thence upwardly through said container; heating element means mounted in the said space between the sidewalls of said housing and said container; a temperature controller arranged and operable for maintaining a pre-set treatment temperature within said apparatus; at least one gas permeable drum mounted within said container for rotation about a horizontal axis, and adapted to receive foodstuffs to be treated; and drive means connected with said drum, operable to effect rotation thereof.

39. Apparatus as recited in claim 38, wherein said heating element means and said temperature controller are effective to establish a pre-set treatment temperature of between 80° and 400° C., and said blower is effective to produce gas flows traversing said rotating permeable drum of between 3 and 10 meters per second.

* * * * *